United States Patent [19]

Wagner

[11] Patent Number: 4,964,282
[45] Date of Patent: Oct. 23, 1990

[54] DETACHABLE BULLETPROOF VEST AIR CONDITIONING APPARATUS

[76] Inventor: Christopher S. Wagner, 1525 Kelly Park Cir., Morgan Hill, Calif. 95037

[21] Appl. No.: 447,236

[22] Filed: Dec. 7, 1989

[51] Int. Cl.⁵ ............................................. F25D 23/12
[52] U.S. Cl. ................................ 62/259.3; 2/DIG. 1; 62/244
[58] Field of Search ................. 62/259.3, 244; 2/2.5, 2/DIG. 1; 428/911; 128/402

[56] References Cited

U.S. PATENT DOCUMENTS

| | | | |
|---|---|---|---|
| 2,826,758 | 3/1958 | Kahn | 2/DIG. 1 |
| 3,468,299 | 9/1969 | D'Amato | 126/204 |
| 3,487,765 | 1/1970 | Lang | 62/259.3 |
| 3,804,086 | 4/1974 | Agnew | 128/146.2 |
| 4,146,933 | 4/1979 | Jenkins et al. | 2/DIG. 1 |
| 4,162,764 | 7/1979 | Millsap | 239/152 |
| 4,194,247 | 3/1980 | Melander | 2/DIG. 1 |
| 4,558,466 | 12/1985 | Kristensson | 2/DIG. 1 |
| 4,691,762 | 9/1987 | Elkins et al. | 165/46 |
| 4,738,119 | 4/1988 | Zafred | 62/259 |

Primary Examiner—Albert J. Makay
Assistant Examiner—John Sollecito
Attorney, Agent, or Firm—Fliesler, Dubb, Meyer & Lovejoy

[57] ABSTRACT

An air cooling apparatus for cooling a bulletproof vest having a front panel section and a rear panel section is provided with a first and a second hollow tubular member. Each of the tubular members has a plurality of holes in the upper wall thereof for permitting air to be discharged therefrom. A plurality of attaching members are provided for attaching the first tubular member to the front panel section and the second tubular member to the rear panel section of the vest. Coupling members are provided for attaching the ends of the first and second tubular members together between the front and rear panel sections of the vest and for detachably coupling the tubular members to a source of cooling air. In a first embodiment of the invention, the source of air is a vehicular air conditioning system and a hose and attaching assembly is provided for attaching the air cooling apparatus to an outlet of the vehicular air conditioning system. In a second embodiment of the invention, a blower is provided for mounting to the motorguard on a motorcycle and is fitted with a hose assembly for coupling to the vest and its air cooling apparatus.

13 Claims, 5 Drawing Sheets

DETACHABLE BULLETPROOF VEST AIR CONDITIONING APPARATUS

BACKGROUND OF THE INVENTION

1. Field of the Invention

The present invention relates in general to articles of clothing comprising an apparatus for providing cooling air to the wearer thereof and in particular to a bulletproof vest and a detachable air conditioning apparatus for use therewith.

2. Description of the Prior Art

In certain occupations and activities special clothing is required to be worn to protect the wearer thereof from environmental, hazardous and other conditions. In order to provide the required protection, the special clothing frequently comprises non-porous material or is fabricated in such a manner that the wearer thereof is made uncomfortably warm while wearing it, especially in the summer.

To eliminate or reduce the discomfort suffered by the wearers of protective garments as described above, various means and methods have been proposed. For example, protective suits, coats and vests have been proposed comprising air or fluid passageways located between the inner and outer fabric layers thereof. A source of cooling air or fluid is introduced into the passageways and, in the case of air, passes via holes provided therein for cooling the wearer. Examples of such clothing are disclosed in U.S. Pat. Nos. 4,558,466, issued to J. A. Kristensson; 4,691,762, issued to W. Elkins, et al; 4,738,119, issued to P. R. Zafred; 4,146,933, issued to Jenkins et al; and 3,468,299, issued to C. D'Amato.

In cases in which a person wearing some sort of outer garment requires cooling but the garment itself does not include a cooling apparatus, cooling air has been provided by means of a separate assembly which is worn beneath the outer clothing. Such assemblies, for example, comprise a plurality of tubular members which are suspended beneath the outer clothing from a wearer's shoulders and/or waist as disclosed in U.S. Pat. Nos. 4,194,247, issued to C. Melander; 3,468,299, issued to C. D'Amato; 3,804,086, issued to B. F. Agnew; and 4,162,764, issued to R. K. Millsap.

The apparatus used for providing the cooling air or fluid to the garments and/or the tubular assemblies as disclosed in the above-listed patents has typically comprised a portable blower or pump or a stationary source of cooling air or fluid which is coupled thereto by a long umbilical-like tube or pipe. Generally, no means is provided for automatically disconnecting the source from the garment or other cooling assembly and the connecting tube or pipe must be manually disconnected if the wearer thereof leaves the vicinity of the cooling air source. Moreover, all of the prior known personal cooling apparatus generally requires a specially constructed source of cooling air.

Police officers and other persons who are required to wear bulletproof vests frequently find them to be quite warm and uncomfortable, especially while riding in a vehicle or on a motorcycle during hot weather. In order to provide cooling for such vests, however, certain requirements must be met. For example, in an emergency, the officer must be free to exit the vehicle or dismount from the motorcycle without any delay caused by being coupled to a source of cooling air or fluid and, as a practical matter, the cooling apparatus should be detachable from the vest when no longer required or when the vest needs cleaning or repair. Moreover, the cooling apparatus should be lightweight and constructed in such a manner that it permits unrestricted movement and cannot be readily grasped by a person being apprehended.

SUMMARY OF THE INVENTION

In view of the foregoing, a principal object of the present invention is a novel cooling apparatus for cooling a person wearing a bulletproof vest.

Another object of the present invention is a novel cooling apparatus for cooling a person wearing a bulletproof vest which is lightweight and constructed in such a manner that it permits unrestricted movement and cannot be readily grasped by a person being apprehended.

Still another object of the present invention is a novel cooling apparatus which is removably attachable to a bulletproof vest for cooling a person wearing the vest.

Still another object of the present invention is a novel cooling apparatus for cooling a person wearing a bulletproof vest which is cooled by air from a vehicular air conditioning system or a blower mounted on a motorcycle.

Still another object of the present invention is a novel cooling apparatus for cooling a person wearing a bulletproof vest which is automatically detachable from a source of cooling air when the vest wearer exits a vehicle or dismounts from a motorcycle.

In accordance with the above objects there is provided an assembly comprising a pair of tubular members having a plurality of air discharge holes in the walls thereof. The tubular members are removably attached to the lower interior edges of the front and rear panel sections of a bulletproof vest as by cloth tab members. Couplings are provided for releasably coupling the tubular members together between the front and rear panel sections of the vest, to a duty belt and to a source of cooling air comprising a flexible hose coupled to an outlet of a vehicular air conditioning system or a motorcycle mounted blower.

In use, the couplings permit easy removal of the vest, removal of the duty belt separately from the vest and, most importantly, automatic detachment from the source of cooling air as may be required in an emergency.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

Figure 1:
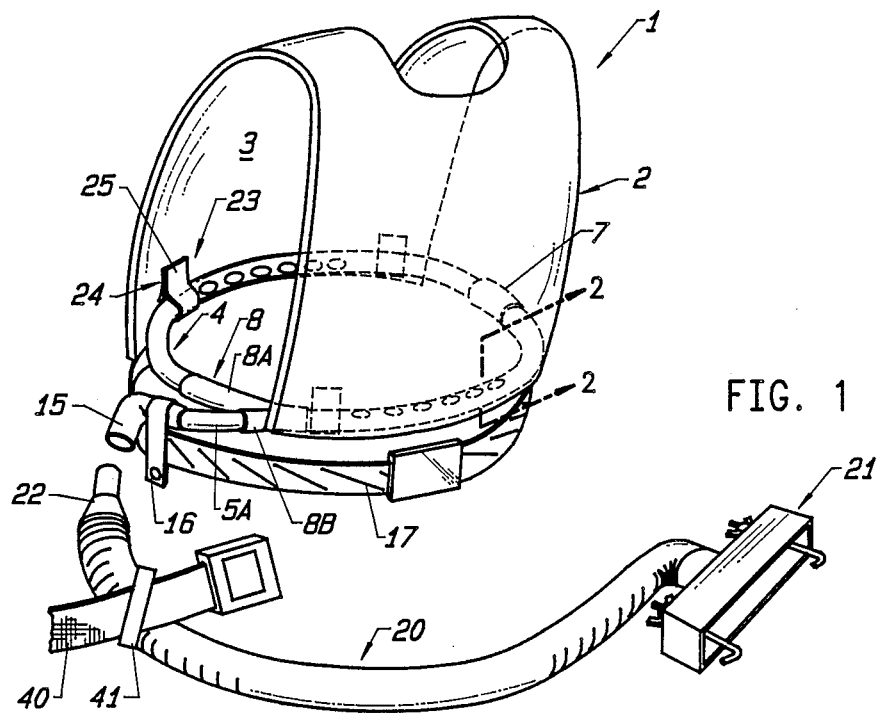
FIG. 1 is a perspective view of a bulletproof vest with a cooling apparatus according to the present invention.

Referring to FIGS. 1-4, there is provided in accordance with the present invention a bulletproof vest designated generally as 1, comprising a front panel section 2 and a rear panel section 3. Removably attached to the lower interior edge of the front and rear panel sections 2, 3 of the vest 1 there is provided a tubular assembly designated generally as 4.

In the assembly 4 there is provided a front tubular member 5, a rear tubular member 6, a hollow cylindrical coupling member 7, a hollow Y-shaped coupling member 8 and a hollow cylindrical tubular stub 5A. The tubular members 5 and 6 comprise hollow tubular members which are sufficiently flexible to be formed into semicircular or U-shaped parts and the coupling member 8 comprises three legs 8A, 8B and 8C with the leg 8A diverging from leg 8B so as to facilitate coupling with tubular member 6, as shown more clearly in FIG. 3.

After the members 5 and 6 have been cut to an appropriate length, depending on the size of the vest to which they are to be removably attached, the coupling member 7 and leg 8C of coupling member 8 are attached, as by adhesive, to opposite ends of the member 5 and the stub 5A is attached, as by adhesive, in the end of the leg 8B of member 8. After the vest is put on, as will be further described below, one end of the member 6 is removably inserted in the coupling 7 in a friction-tight manner and the opposite end of the member 6 is removably inserted in the leg 8A of the coupling 8 in a friction-tight manner.

In each of the tubular members 5 and 6 there is further provided a plurality of holes 9 and 10, respectively. Holes 9 and 10 are orientated at an angle such that air flowing therefrom is directed upwardly and toward the center of the vest at about a 45° angle, as shown more clearly by the arrow 11 in FIG. 2.

Removably coupled to the end of the stub 5A there is provided an L-shaped coupling 15. A strap 16 is provided for attaching the coupling 15 to a duty belt 17, or the like.

Referring to FIG. 1, there is further provided in accordance with the present invention, an elongated flexible tube or hose 20 and an attaching assembly 21. One end of the hose 20 is provided with a coupling member 22 for removably coupling the hose 20 to the fitting 15. The opposite end of the hose 20 is coupled to the attaching assembly 21, as will be further described below.

Figure 2:
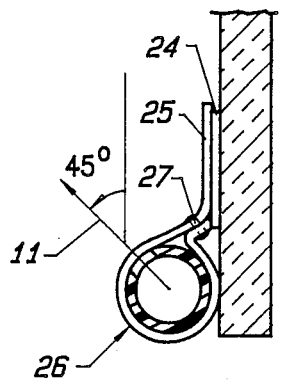
FIG. 2 is a partial cross-sectional view taken in the direction of lines 2—2 of FIG. 1.
Figure 3:
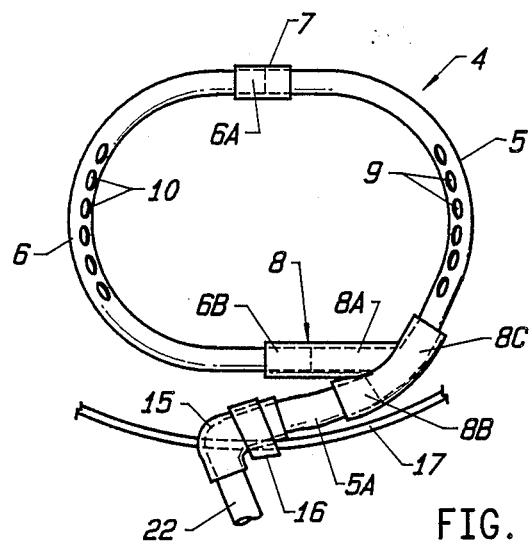
FIG. 3 is a top plan view of the tubular members removably attached to the vest in the apparatus of FIG. 1.
Figure 4:
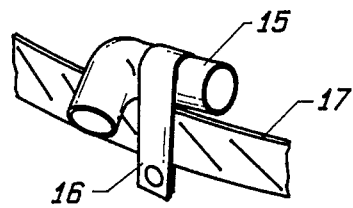
FIG. 4 is a perspective view of an L-shaped fitting in the apparatus of FIG. 3 which is attached to a duty belt according to the present invention.
Figure 5:
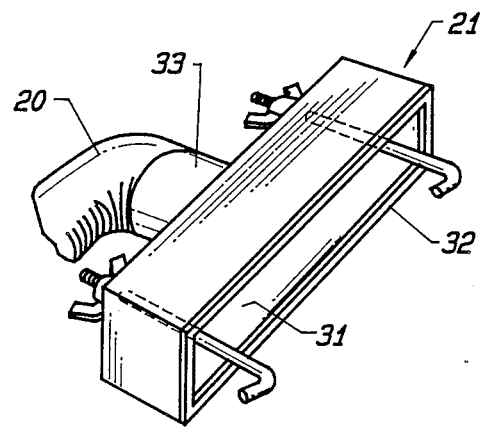
FIG. 5 is a perspective view of a hose attachment assembly for removably attaching the cooling apparatus of the present invention to the outlet of a vehicular air conditioning system.
Figure 6:
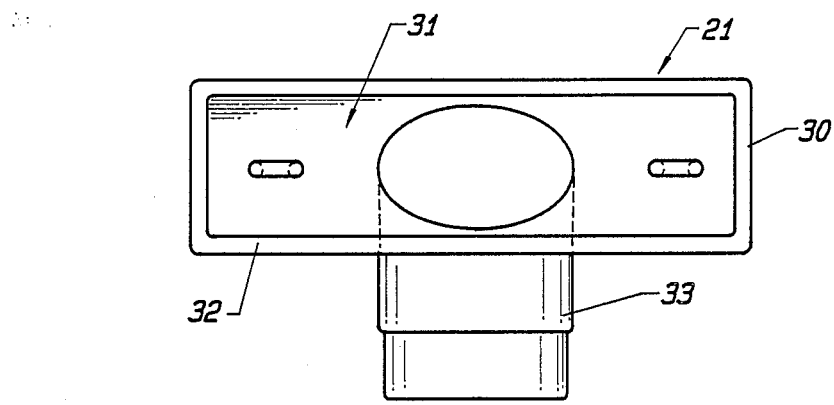
FIG. 6 is a front elevation view of the attachment of FIG. 5.
Figure 7:
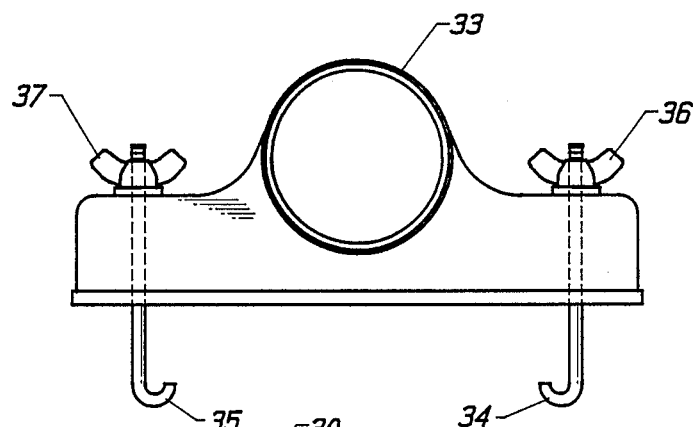
FIG. 7 is a bottom plan view of FIG. 6.
Figure 8:
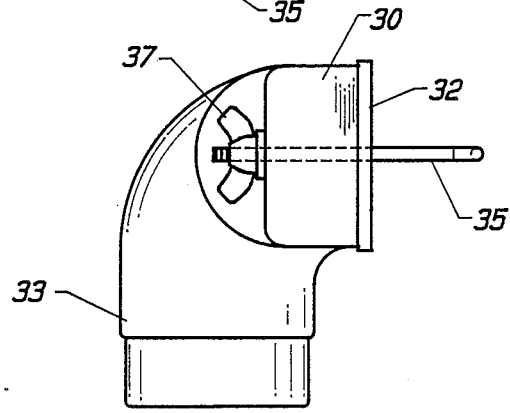
FIG. 8 is a side elevation view of FIG. 7.

As shown more clearly in FIGS. 1 and 2, the front and rear tubular members 5 and 6 are removably attached to the front and rear vest panels 2 and 3 by means of a plurality of attaching members designated generally as 23. Each of the attaching members 23 comprises a first attaching member 24 and a second attaching member 25. The member 24 is sewn or otherwise permanently attached to the interior of the vest panels 2 and 3. Attaching member 25 is provided with a lower section which forms a loop 26 which wraps about the tubular members 5 and 6 and is secured to itself as by sewing or an adhesive at a point 27. Typically, the member 24 comprises a fabric patch having nylon looped material on a surface thereof and the member 25 comprises a fabric tab having nylon hooks on a surface thereof which when pressed against the looped material, engage the loops for removably attaching the member 25 to the member 24. Such material is typically sold under the trade or brand name Velcro.

Referring to FIGS. 5-8, there is provided in the attaching assembly 21 a rectangularly-shaped housing 30 having an open end 31. Mounted to the edge of the open end 31 there is provided a soft resilient sealing material 32. At the rear of the attaching assembly 21 there is provided a hose coupling 33 for attaching the attaching assembly 21 to the hose 20. The hose coupling 33 is typically rotatably attached to the housing 30 so as to permit the hose 20 to be swiveled relative thereto. Extending through the housing 30 there is provided a pair of elongated hook members 34 and 35 which are fitted with wing nuts 36 and 37, respectively. The hook members 34 and 35 are used for removably attaching the attaching assembly 21 to the outlet of a vehicular air conditioning system.

In use, the attaching assembly 21 is fitted over a conventional outlet (not shown) of a vehicular air conditioning system and the hook members are manipulated to engage brackets or other members normally located therein. The wing nuts 36 and 37 are then turned, drawing the hook members toward the housing 30 causing the housing 30 to form an air-tight seal over the vehicular air conditioning system outlet. The opposite end of the hose 20 is preferably attached to a seat belt 40 as by a strap or the like 41.

In operation, air flowing from the vehicular air conditioning outlet flows into the housing 30 and through the pipe 20. From the pipe 20 the air flows through the coupling 22 and the fitting 15 into the front tubular member 5. From the front tubular member 5 the air flows through the hollow coupling 7 and into the rear tubular member 6. As the air flows through members 5 and 6, it is discharged through the holes 9 and 10 for cooling the wearer of the vest.

To assemble the vest and air cooling apparatus of the present invention, the tubular member 6 is removed from the tubular member 5 by separating the two members at the couplings 7 and 8. The tubular members 5 and 6 are then inserted in the loop 26 of two of the attaching members 25, respectively. The members 25 are then pressed against the attaching members 24. After the wearer places the vest over his or her shoulders, the tubular members 5 and 6 are coupled by inserting the ends 6A and 6B into the coupling members 7 and 8. At this point, the vest wearer puts on his or her duty belt 17, or thereafter puts it on, with the fitting 15 attached thereto by the strap member 16. With the fitting 15 in position, the opposite end of the stub 5A is then removably inserted in the fitting 15. After the wearer is seated in the driver seat of a vehicle, the fitting 22 of the hose 20 is removably inserted in the opposite end of the fitting 15. The arrangement as thus described completes the assembly of the air-cooled vest. Cooling air is then free to flow through the tubular members 5 and 6 as described above.

When the wearer exits a vehicle in an emergency, the fitting 15 will automatically disengage from the fitting 22. This is due to the fact that the fitting 15 is attached to the duty belt 17 by means of the strap 16 and the hose 20 is attached to the driver's seat belt by means of the strap 41.

In case the wearer wishes to remove the duty belt without removing the vest, the stub 5A can be decoupled from the fitting 15 by simply pulling the stub 5A from the fitting 15. If after removing the stub 5A from the fitting 15 the wearer chooses to remove the vest, the wearer simply separates the tubular members 5 and 6 at the couplings 7 and 8 so as to easily remove the vest in a conventional manner. To remove the tubular members 5 and 6 from the vest, the attaching members 25 are simply disengaged from the members 24.

Figure 9:
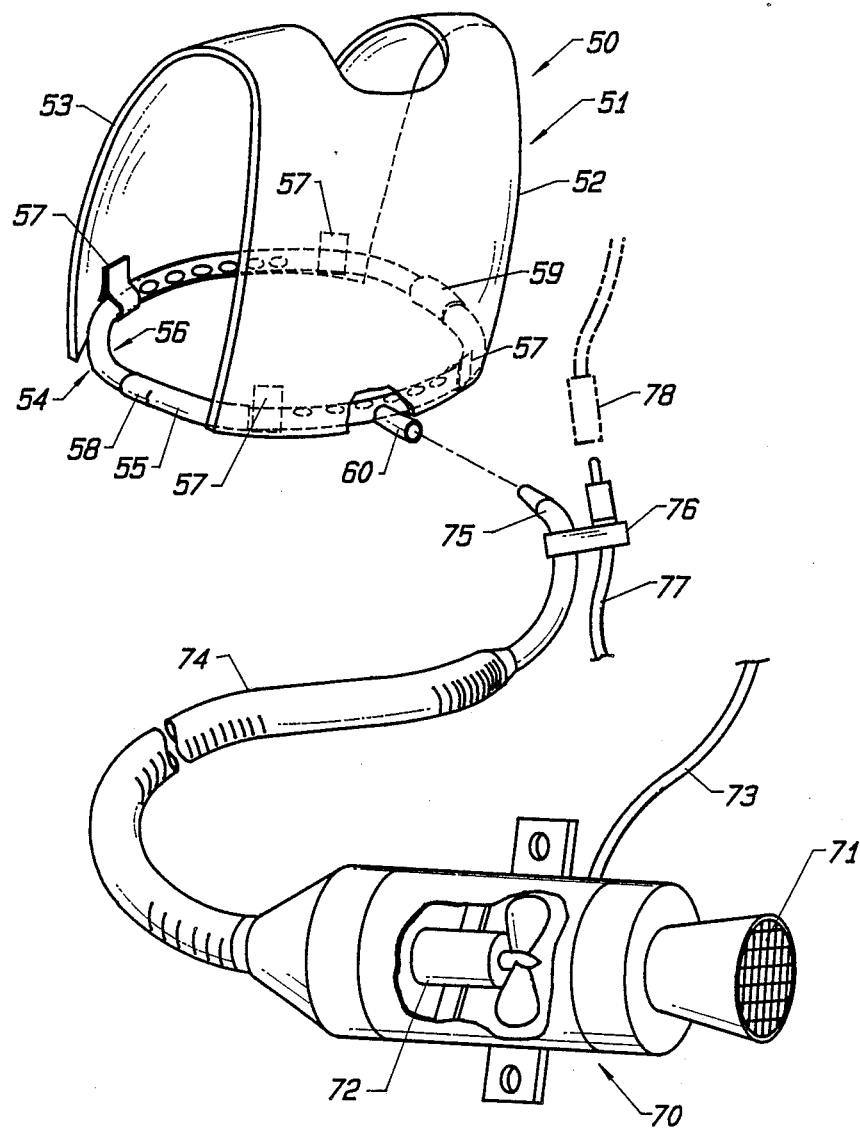
FIG. 9 is an alternative embodiment of the present invention for use by a person riding a motorcycle.

Referring to FIG. 9, there is provided in an alternative embodiment of the present invention a vest and cooling assembly designated generally as 50 for use by a person while operating a motorcycle. In the assembly 50 there is provided a bulletproof vest 51 having a front and rear panel section 52 and 53, respectively. At the lower interior edges of the sections 52 and 53 there is removably attached a tubular assembly 54 comprising a front tubular member 55 and a rear tubular member 56. The tubular members 55 and 56 are removably attached to the vest panel sections 52 and 53 by means of attaching members 57. The front tubular member 55 is coupled to the rear tubular member 56 by means of a pair of coupling members 58 and 59. Members 58 and 59 are enlarged sections of the ends of the member 55 which are adapted for removably receiving the ends of the member 56. As thus far described, the vest 51 and the tubular sections 55 and 56 and the attaching members 57 and couplings 58 and 59 are identical to those described above with respect to the embodiment of FIGS. 1-4, the only difference being that instead of being coupled to a source of cooling air from one end, as is the member 5, the front tubular member 55 is provided with a forwardly extending coupling member 60 which extends outwardly from the midpoint thereof.

To provide cooling air to the vest assembly 50 there is provided a blower designated generally as 70. The blower 70 is provided with an air input port 71 and a motor-driven fan assembly 72 which is driven from a source of electrical power (not shown) via an electrical cable 73. Coupled to the rear of the assembly 70 there is provided a hollow flexible hose assembly 74. At the opposite end of the assembly 74 there is provided a coupling member 75. The member 75 is provided for removably coupling the hose 74 to the coupling 60 extending from the midpoint of the front tubular section 55.

Attached to the hose 74 near the fitting 75 there is provided a strap 76. The strap 76 is provided for coupling the hose 74 to a headphone/microphone connecting cable 77 which is standard equipment on, and attached to, a police officer's motorcycle. The cable 77 is generally coupled to a mating cable 78 which is standard equipment in a police officer's motorcycle helmet.

Figure 10:
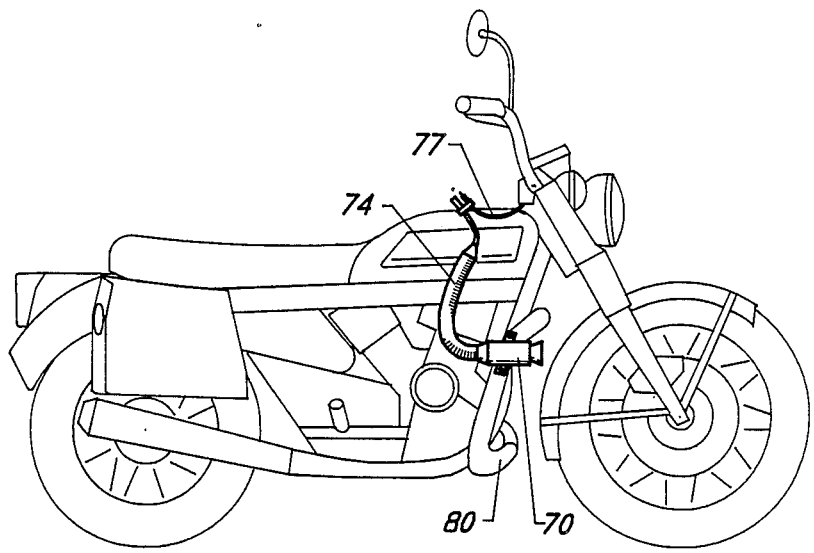
FIG. 10 is a side elevation view showing a blower as a source of cooling air mounted on a motorcycle according to the present invention.

Referring to FIG. 10, the blower assembly 70 is typically mounted to a motorguard 80 which is standard equipment on a police motorcycle.

The vest and tubular assembly 50 are assembled and worn in the same manner as described above with respect to the vest of FIGS. 1-4.

The fan motor-driven assembly 72 provides air flow while the motorcycle is driven but, more importantly, provides air flow when the motorcycle is at a standstill.

When dismounting from the motorcycle, the attachment of the hose 74 to the earphone/microphone cable assembly 77 causes the hose 74 to be automatically detached from the coupling 60.

While preferred embodiments of the present invention are described above, it is contemplated that various modifications may be made thereto without departing from the spirit and scope of the present invention. For example, the attaching assembly 21 can be modified to fit over any conventional vehicular air conditioning system outlet, the hose 20 can be coupled to the opposite side of the members 5 and 6 for use by a passenger and the hose 74 can be attached in any other manner to a motorcycle so as to permit automatic disengagement of the hose from the coupling 60 in an emergency. In fabricating the coupling 8, the inner diameter of the legs 8C and 8B can be made large enough to slip over an extended portion of the member 5. If that is done, the stub 5A is not required and the end of the extended member 5 can be removably inserted in the fitting 15 after member 5 is cut to the required length for the size vest with which it is to be used. Accordingly, it is intended that the embodiments described be considered only as an illustration of the present invention and that the scope thereof should not be limited thereto but be determined by reference to the claims hereinafter provided and their equivalents.

What is claimed is:

1. An air cooling apparatus for cooling a bulletproof vest having a front panel section and a rear panel section comprising:
   a first and a second hollow tubular member, each of said members having a plurality of holes in the upper wall thereof for permitting air to be discharged therefrom;
   means for removably attaching said first tubular member to said front panel section and said second tubular member to said rear panel section of said bulletproof vest;
   first means for detachably coupling said first and said second tubular members together; and
   second means including a flexible hose means for detachably coupling said first and said second tubular members to a source of cooling air, said second means including means for automatically disengaging said first and said second tubular members from said hose means when said first and said second tubular members are pulled away from said hose means.

2. An apparatus according to claim 1 wherein said holes in said first tubular member are located at a first predetermined angle from a vertical line so as to discharge air upwardly and toward said rear panel section and said holes in said second tubular member are located at a second predetermined angle from a vertical line so as to discharge air upwardly and toward said front panel section.

3. An apparatus according to claim 2 wherein said first and said second predetermined angle is approximately 45 degrees.

4. An apparatus according to claim 1 wherein said attaching means comprises means for removably attaching said first tubular member to the interior of said front panel member near the lower edge thereof and said second tubular member to the interior of said rear panel member near the lower edge thereof.

5. An apparatus according to claim 4 wherein said attaching means comprises a plurality of fabric tab members, each of said tab members being adapted to wrap about said first and said second tubular members and having means located thereon for removably attaching said tab member to said bulletproof vest.

6. An apparatus according to claim 1 wherein said first coupling means comprises a first and a second coupling member for detachably coupling said first and said second tubular members together at a first and a second location, respectively, said first location being between the left edges and said second location being between the right edges of said front and rear panel sections of said bulletproof vest, respectively, so as to facilitate the putting on and the taking off of said bulletproof vest by a wearer thereof.

7. An apparatus according to claim 6 wherein at least one of said first and said second coupling members comprises a hollow tubular member for providing an air passageway between said first and said second tubular members.

8. An apparatus according to claim 1 wherein said second coupling means comprises a hollow tubular fitting having a first end adapted to be detachably coupled to one of said first and said second tubular members and a second end adapted to be detachably coupled to said source of cooling air for passing cooling air from said source to said first and second tubular members, said fitting being located at a point between said front and rear panel sections of said bulletproof vest.

9. An apparatus according to claim 8 wherein said second coupling means comprises means for attaching said fitting to a belt.

10. An apparatus according to claim 8 wherein said second coupling means comprises an elongated flexible hollow hose member having means located on a first end thereof for detachably coupling said hose member to said second end of said fitting and means located on a second end thereof for detachably coupling said hose member to said source of cooling air.

11. An apparatus according to claim 10 wherein said coupling means located on said second end of said hose member comprises outlet coupling means for detachably coupling said hose member to a vehicular air conditioning system outlet in the passenger compartment of a motor vehicle.

12. An apparatus according to claim 11 wherein said outlet coupling means comprises a housing having a pair of fittings for releasably attaching said housing over said outlet.

13. An apparatus according to claim 1 wherein said second coupling means for coupling said first and said second tubular members to a source of cooling air comprises:
   a hollow tubular coupling member which extends from the midpoint of said first tubular member;
   means located at a first end of said flexible hose means for removably coupling said hose member and said hollow tubular coupling member and means located at a second end of said hose means for coupling said hose means to a blower mounted on a motorcycle.

* * * * *